(12) United States Patent
Kim et al.

(10) Patent No.: US 10,191,496 B2
(45) Date of Patent: Jan. 29, 2019

(54) UNMANNED AERIAL VEHICLE AND A LANDING GUIDANCE METHOD USING THE SAME

(71) Applicant: Foundation of Soongsil University-Industry Cooperation, Seoul (KR)

(72) Inventors: Jin Oh Kim, Seoul (KR); Sang Ok Seon, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 54 days.

(21) Appl. No.: 15/492,099

(22) Filed: Apr. 20, 2017

(65) Prior Publication Data

US 2017/0308099 A1 Oct. 26, 2017

(30) Foreign Application Priority Data

Apr. 21, 2016 (KR) .................. 10-2016-0048612
Apr. 13, 2017 (KR) .................. 10-2017-0047864

(51) Int. Cl.
*G05D 1/06* (2006.01)
*G01S 15/08* (2006.01)
(Continued)

(52) U.S. Cl.
CPC ........... *G05D 1/0676* (2013.01); *B64C 17/06* (2013.01); *B64C 27/08* (2013.01); *B64C 39/024* (2013.01);
(Continued)

(58) Field of Classification Search
CPC .... G05D 1/0676; G05D 1/0022; G01S 15/08; B64D 45/04; B64C 17/06; B64C 27/08; B64C 2201/123
See application file for complete search history.

(56) References Cited

U.S. PATENT DOCUMENTS

2012/0209502 A1* 8/2012 Nichols ............... B62D 53/021
701/124
2017/0166325 A1* 6/2017 Gao ..................... G03B 21/14
2017/0299720 A1* 10/2017 Matsuura ............... B60R 21/00

FOREIGN PATENT DOCUMENTS

KR 10-0823739 A 4/2008
KR 10-2012-0081500 A 7/2012
(Continued)

*Primary Examiner* — Yonel Beaulieu
*Assistant Examiner* — Martin A Weeks
(74) *Attorney, Agent, or Firm* — Novick, Kim & Lee, PLLC; Sang Ho Lee

(57) ABSTRACT

An unmanned aerial vehicle (UAV) is provided. The UAV includes a main body, a plurality of motors connected to the main body, each of the plurality of motors having a rotor blade, a plurality of ultrasonic sensors located at least one of the plurality of motors and the main body, and transmitting and receiving ultrasonic waves to and from a ground surface, and measuring distances from the ground surface, a gyro sensor disposed at the main body and maintaining the UAV in a horizontal state, and a controller disposed at the main body, detecting an unevenness of the ground surface based on the distances from the plurality of ultrasonic sensors to the ground surface, generating a control signal whether to land on the ground surface or not in response to the detection of the unevenness, and transmitting the control signal to the plurality of motors.

20 Claims, 15 Drawing Sheets

(51) Int. Cl.
  *B64C 27/08*   (2006.01)
  *B64C 17/06*   (2006.01)
  *B64C 39/02*   (2006.01)
  *B64D 45/04*   (2006.01)
  *G01S 7/521*   (2006.01)
  *G01S 15/87*   (2006.01)
  *G01S 15/88*   (2006.01)
(52) U.S. Cl.
  CPC .............. *B64D 45/04* (2013.01); *G01S 7/521* (2013.01); *G01S 15/08* (2013.01); *G01S 15/87* (2013.01); *G01S 15/88* (2013.01); *B64C 2201/123* (2013.01)

(56) References Cited

FOREIGN PATENT DOCUMENTS

KR    10-2013-0133480 A    12/2013
KR    10-2014-0123835 A    10/2014

\* cited by examiner

UNMANNED AERIAL VEHICLE AND A LANDING GUIDANCE METHOD USING THE SAME

CROSS-REFERENCE TO RELATED APPLICATION

This application claims priority to and the benefit of Korean Patent Application No. 10-2016-0048612, filed on Apr. 21, 2016, and Korean Patent Application No. 10-2017-0047864, filed on Apr. 13, 2017, the disclosure of which is incorporated herein by reference in its entirety.

BACKGROUND

The present disclosure relates to an unmanned aerial vehicle (UAV) that uses ultrasonic waves so that the UAV may safely land on the ground, a landing guidance method using the same.

An unmanned aerial vehicle (UAV), which is also referred to as an uninhabited aerial vehicle, refers to an aircraft produced to carry out a specified mission without a human pilot. A UAV is equipped with equipment such as an optical sensor, an infrared sensor, or a radar sensor depending on an application field to carry out missions such as surveillance, reconnaissance, communication, and information delivery for places that are difficult for people to reach.

Recently, UAVs have been widely used as a kind of hobby by various people regardless of age and gender, as well as for the aforementioned military purposes. For example, a UAV may be used to image places that are difficult for people to image themselves, such as a volcanic crater or a cliff.

UAVs were first developed for military purposes, but have recently been widely used in the private sector. In particular, a UAV is used outdoors mainly for the purpose of aerial photography. However, expensive and sensitive equipment, such as various cameras and sensors included in an aircraft, are easily damaged during take-off and landing of the aircraft because outdoor ground surfaces are not uniform or have a severe slope unlike an indoor ground surface.

SUMMARY OF THE DISCLOSURE

The present disclosure is directed to providing an unmanned aerial vehicle (UAV) using ultrasonic waves, the UAV being configured to transmit and receive ultrasonic waves to and from a ground surface for landing before the UAV lands on the ground surface, check a state of the ground surface, determine whether the ground surface is suitable for landing, and guide a smooth landing of the UAV on the ground surface, and a landing guidance method using the same.

According to an aspect of the present disclosure, an unmanned aerial vehicle (UAV) is provided. The UAV includes a main body, a plurality of motors connected to the main body, each of the plurality of motors having a rotor blade, a plurality of ultrasonic sensors located at least one of the plurality of motors and the main body, and transmitting and receiving ultrasonic waves to and from a ground surface, and measuring distances from the ground surface, a gyro sensor disposed at the main body and maintaining the UAV in a horizontal state, and a controller disposed at the main body, detecting an unevenness of the ground surface based on the distances from the plurality of ultrasonic sensors to the ground surface, generating a control signal whether to land on the ground surface or not in response to the detection of the unevenness, and transmitting the control signal to the plurality of motors.

The plurality of motors are connected to the main body via connection bars, and the plurality of ultrasonic sensors are located underneath the plurality of motors, the connection bars, and main body.

The UAV may further include sensor protection cases disposed at the plurality of motors to surround the plurality of ultrasonic sensors. The sensor protection cases may be made of synthetic rubber or coil springs.

The plurality of ultrasonic sensors includes a first ultrasonic sensor and a second ultrasonic sensor, the first ultrasonic sensor and the second ultrasonic sensor are spaced apart on the UAV by a sensor distance (DS), the first ultrasonic sensor measures a first distance (D1) from the first ultrasonic sensor to the ground surface, the second ultrasonic sensor measures a second distance (D2) from the second ultrasonic sensor to the ground surface, and the controller receives distance information including the sensor distance (DS), the first distance (D1), and the second distance (D2), calculates a slope of the ground surface, and determines a landing if the slope of the ground surface is within a predetermined range.

When the first ultrasonic sensor and the second ultrasonic sensor measures the first and second distances (D1 and D2) respectively, the UAV is in a horizontal state.

A perpendicular foot is drawn from the main body onto the ground surface, the main body rotates with respect to the perpendicular foot at a different angle, the first ultrasonic sensor and the second ultrasonic sensor measure the first and second distances (D1 and D2) for each of the different angle. The main body rotates with respect to the perpendicular foot more than 360°.

Each of the motors is a stepping motor or a servo motor.

The UAV may further include a plurality of temperature sensors located on the main body and measuring internal or external temperature of the UAV.

The plurality of ultrasonic sensors includes a first ultrasonic sensor and a center ultrasonic sensor, the plurality of motors include a first motor, the first ultrasonic sensor is located underneath the first motor and surrounded by a first sensor protection case, and the center ultrasonic sensor is located underneath the main body. α refers to a distance from one end of the first sensor protection case to the first ultrasonic sensor, β refers to a distance from one end of the first ultrasonic to the center ultrasonic sensor in a vertical direction, and a threshold reference height (TRH) is obtained by the following equation: TRH=α+β, and if the threshold reference height (TRH) is greater than a height of the ground (HG), the controller generates the control signal to land on the ground surface. The first ultrasonic sensor measures a first distance (D1) from the first ultrasonic sensor to the ground surface, the center ultrasonic sensor measures a center distance (CD) from the center ultrasonic sensor to the ground surface, and the height of the ground (HG) is obtained by the following equation: HG=D1−CD+β.

According to another aspect of the present disclosure, a landing guidance method for an unmanned aerial vehicle (UAV) using ultrasonic waves is provided. The landing guidance method includes adjusting, a gyro sensor located in a main body, the UAV in a horizontal state, measuring distances from the ground surface for landing by transmitting and receiving, by a plurality of ultrasonic sensors located in the UAV, ultrasonic waves to and from the ground surface, detecting an unevenness of the ground surface based on the distances from the plurality of ultrasonic sensors to the ground surface, generating a control signal whether to land on the ground surface or not in response to the detection of the unevenness, and transmitting the control signal to a plurality of motors.

The plurality of ultrasonic sensors includes a first ultrasonic sensor and a second ultrasonic sensor, the first ultrasonic sensor and the second ultrasonic sensor are spaced apart on the UAV by a sensor distance (DS), the step of detecting the unevenness of the ground surface includes measuring, by the first ultrasonic sensor, a first distance (D1) from the first ultrasonic sensor to the ground surface, measuring, by the second ultrasonic sensor, a second distance (D2) from the second ultrasonic sensor to the ground surface, receiving, by the controller, distance information including the sensor distance (DS), the first distance (D1), and the second distance (D2), calculating the unevenness of the ground surface, determining a landing if the slope of the ground surface is within a predetermined range, and generating and transmitting a control signal to the plurality of motors.

The unevenness of the ground surface is a slope of the ground surface.

The step of detecting an unevenness of the ground surface includes comparing gradients of points of the ground surface around a reference point with a predetermined convexity threshold when it is determined that the ground surface is convex according to the gradients of the points around the reference point, and determining whether the ground surface is suitable for landing and controlling the control signal corresponding to a determination whether the gradients of points are smaller than the predetermined convexity threshold, or comparing the gradients of the points of the ground surface around the reference point with a predetermined concavity threshold when it is determined that the ground surface is concave according to the gradients of the points around the reference point, and determining whether the ground surface is suitable for landing and controlling the control signal corresponding to the determination whether the gradients are smaller than the predetermined concavity threshold.

The landing guidance method may further includes transmitting and receiving, by the ultrasonic sensors, ultrasonic waves to and from the ground surface while the UAV is descending toward the ground surface, analyzing the ultrasonic waves received by the ultrasonic sensors and determining, by the controller, whether there is an obstacle on the ground surface toward which the UAV is descending, adjusting, by the gyro sensor, the UAV in the horizontal state when it is determined that there is an obstacle on the ground surface, generating, by the controller, a signal to the UAV to rotate a circle for a predetermined number about an axis perpendicular from the main body to the ground surface, transmitting and receiving, by the controller, ultrasonic waves to and from the ground surface for descending when the UAV rotates multiple times, analyzing, by the controller, the ultrasonic waves and re-determining whether there is an obstacle on the ground surface, and re-determining, by the controller, whether the ground surface is suitable for the UAV to land on in reply to a determination whether there is an obstacle on the ground surface.

The landing guidance method may further include analyzing, by the controller, the ultrasonic waves received from the ground surface and determining a physical property of the ground surface.

The plurality of ultrasonic sensors includes a first ultrasonic sensor and a center ultrasonic sensor, the plurality of motors include a first motor, the first ultrasonic sensor is located underneath the first motor and surrounded by a first sensor protection case, and the center ultrasonic sensor is located underneath the main body, $\alpha$ refers to a distance from one end of the first sensor protection case to the first ultrasonic sensor, $\beta$ refers to a distance from one end of the first ultrasonic to the center ultrasonic sensor in a vertical direction, a threshold reference height (TRH) is obtained by the following equation: TRH=$\alpha+\beta$, and if the threshold reference height (TRH) is greater than a height of the ground (HG), the step of the generating the control signal generates the control signal to land on the ground surface. The first ultrasonic sensor measures a first distance (D1) from the first ultrasonic sensor to the ground surface, the center ultrasonic sensor measures a center distance (CD) from the center ultrasonic sensor to the ground surface; and the height of the ground (HG) is obtained by the following equation: HG=D1−CD+$\beta$.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
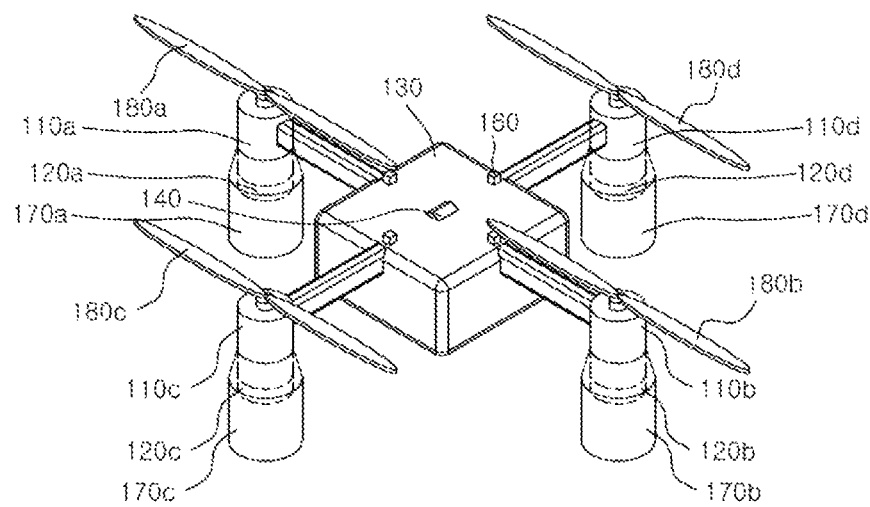
FIG. 1 is a schematic diagram of an unmanned aerial vehicle (UAV) using ultrasonic waves according to an embodiment of the present disclosure.

Hereinafter, example embodiments of the present disclosure will be described in detail with reference to the accompanying drawings so that those skilled in the art may easily carry out the embodiments of the present disclosure. However, these embodiments are merely described to explain in detail the present disclosure. Accordingly, it should be obvious to those skilled in the art that the present disclosure is not limited to the embodiments.

A configuration of the present disclosure for clarifying the solution of the problem to be solved by the present disclosure will be described in detail with reference to the accompanying drawings on the basis of the exemplary embodiments of the present disclosure. When elements in the drawings are denoted by reference numerals, like elements are denoted by like reference numerals although the elements are in different drawings, and it should be noted in advance that elements in different drawings are quoted in a case where description of corresponding drawings is needed. However, it should be understood that the present disclosure is not limited to the specific example embodiments, but includes all modifications, equivalents, and substitutions included in the spirit and the scope of the present disclosure.

In the following description of an operation principle according to the example embodiments of the present disclosure, when a relevant known function or configuration and other matters are determined to unnecessarily obscure the subject matter of the present disclosure, a detailed description thereof will be omitted.

In addition, in this disclosure, when one part is referred to as being "connected" to another part, it should be understood that the former can be "directly connected" to the latter or "indirectly connected" to the latter via an intervening part. Furthermore, when one part is referred to as "comprising" (or "including" or "having") other elements, it should be understood that it can comprise (or include or have) only those elements, or other elements as well as those elements may be included when there is no specific limitation.

It should be understood that, although the terms first, second, etc. may be used herein to describe various elements, these elements are not limited by these terms. These terms may be only used to distinguish one element from another. For example, a first element could be termed a second element, and, similarly, a second element could be termed a first element, without departing from the scope of example embodiments of the present disclosure.

The terminology used herein is for the purpose of describing particular embodiments only and is not intended to be limiting of example embodiments of the disclosure. As used herein, the singular forms "a," "an," and "the" are intended to include the plural forms as well unless the context clearly indicates otherwise. It should be further understood that the terms "comprises," "comprising," "includes," "including," and/or "having" specify the presence of stated features, integers, steps, operations, elements, and/or components when used herein, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. Terms such as terms that are generally used and are in dictionaries should be construed as having meanings matching contextual meanings in the art. In this description, unless defined clearly, terms are not ideally or excessively construed as having formal meanings.

A process of smoothly guiding a take-off and landing of an unmanned aerial vehicle (UAV) that is usually used outdoors for the purpose of imaging or various measurements, and in particular, a process of smoothly guiding a landing of the UAV according to a condition of a ground surface when the UAV is landing on the ground will be described in detail.

A UAV according to an embodiment of the present disclosure will be described below in detail with reference to FIGS. 1 to 3.

Figure 2:
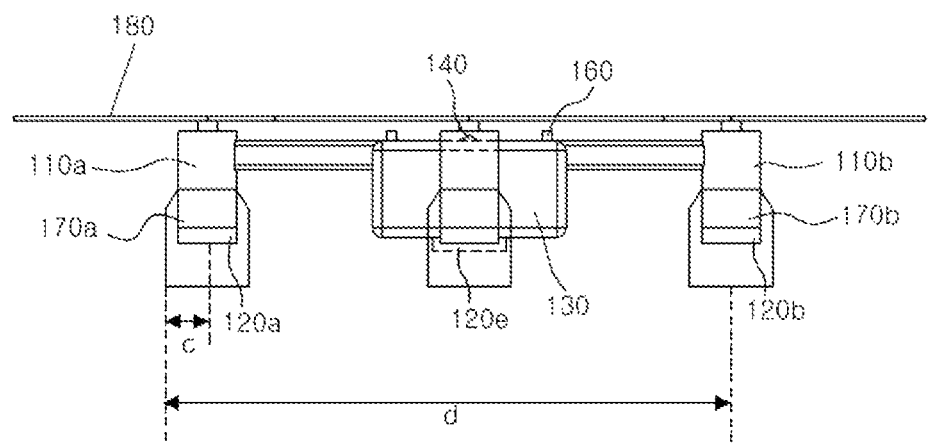
FIG. 2 is a side view of a UAV using ultrasonic waves according to an embodiment of the present disclosure.
Figure 3:
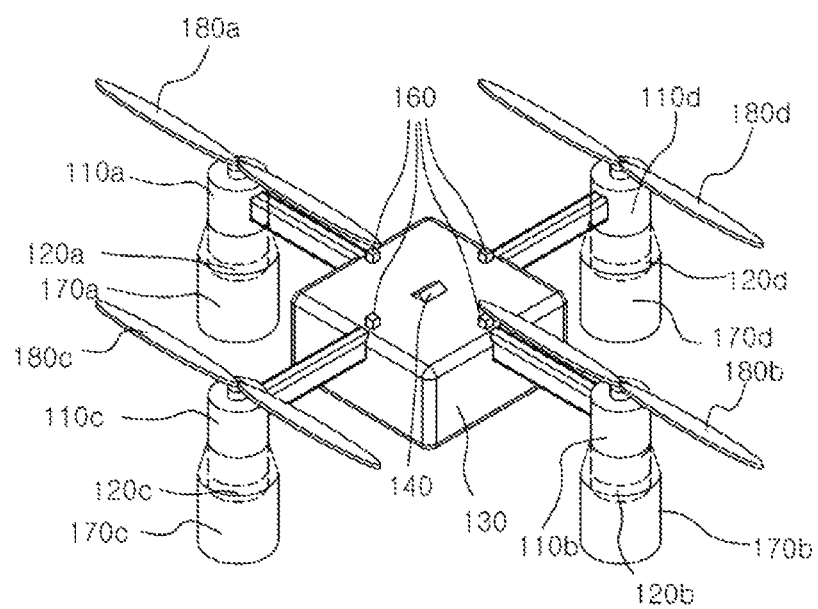
FIG. 3 is a perspective view of a UAV using ultrasonic waves according to an embodiment of the present disclosure.

FIG. 1 is a schematic diagram of a UAV using ultrasonic waves according to an embodiment of the present disclosure, FIG. 2 is a side view of a UAV using ultrasonic waves according to an embodiment of the present disclosure, and FIG. 3 is a perspective view of a UAV using ultrasonic waves according to an embodiment of the present disclosure.

As shown in FIGS. 1 to 3, a UAV 100 using ultrasonic waves according to an embodiment of the present disclosure may include motors 110a, 110b, 110c, and 110d, ultrasonic sensors 120a, 120b, 120c, and 120d, a gyro sensor 140, a controller (not shown), a plurality of temperature sensors 160, and sensor protection cases 170a, 170b, 170c, and 170d.

The motors 110a, 110b, 110c, and 110d are connected to a main body 130 located at the center of the UAV 100 through connection bars in a radial form and tops thereof are respectively connected to a plurality of rotor blades 180a, 180b, 180c, and 180d to control a take-off and landing of the UAV 100. According to an embodiment of the present disclosure, the motors 110a, 110b, 110c, and 110d are connected to the main body 130 in four directions. Thus, the motors 110a, 110b, 110c, and 110d are connected to the main body 130 through the connection bars at a certain distance and are also installed to have same distance from one another. In this case, each of the motors 110a, 110b, 110c, and 110d may be a stepping motor that moves a certain angle corresponding to the number of input pulses or a servo motor that converts a voltage input into a rotation angle.

The ultrasonic sensors 120a, 120b, 120c, 120d, and 120e are located under the motors 110a, 110b, 110c, and 110d located at the same distance in the four directions, located under the main body 130, or located at the connection bars connected between the main body 130 and the rotor blades 180a, 180b, 180c, and 180d. The ultrasonic sensors 120a, 120b, 120c, 120d, and 120e transmit and receive ultrasonic waves toward and from a ground surface for landing and then measure a distance from the ground surface. The ultrasonic sensors 120a, 120b, 120c, and 120d are located under the motors 110a, 110b, 110c, and 110d as pairs that face each other. Each of the ultrasonic sensors 120a, 120b, 120c, 120d, and 120e is composed of a transmitter and a receiver. When the transmitter transmits ultrasonic waves toward a ground surface for landing, the receiver receives ultrasonic waves transmitted by the transmitter and then reflected from the ground surface, collects the received ultrasonic waves, and measures a distance between the UAV 100 and the ground surface.

The gyro sensor 140 is located inside the main body 130 located at the center of the UAV 100 and is configured to measure and adjust a horizontal state of the UAV 100 to maintain the horizontal state of the UAV 100. In particular, a three-axis gyro sensor is used to adjust the horizontal state of the UAV 100 with respect to an x axis, a y axis, and a z axis. A horizontal adjustment for a UAV using a gyro sensor is performed to accurately measure a distance from a ground surface and a gradient (i.e., a degree of slope) of the ground surface. In this case, instead of the gyro sensor, a mercury or water droplet in a transparent tube may be provided inside the main body 130 located at the center of the UAV 100. The horizontal state of the UAV 100 may be measured and adjusted by checking a position of the mercury or water droplet in the transparent tube through some of the ultrasonic sensors and utilizing a result of the check.

The controller (not shown) is located inside the main body and is configured to receive a control signal for flying, taking-off, or landing the UAV 100 from a wireless remote controller on the ground. Also, the controller determines a gradient of a ground surface on the basis of information on distances from the ground surface measured by the ultrasonic sensors 120a, 120b, 120c, 120d, and 120e, generates a control signal to determine whether to land on the ground surface according to the determined gradient, and transmits the generated control signal to the motors 110a, 110b, 110c, and 110d. The controller may receive information on distances from the ground surface measured by a first ultrasonic sensor 120a and a second ultrasonic sensor 120b, which are paired and positioned facing each other, calculate the slope of the ground surface (or the gradient of the ground surface) using the information on the distance from the ground surface measured by the first ultrasonic sensor 120a, the information on the distance from the ground surface measured by the second ultrasonic sensor 120b, and information on a distance between the first ultrasonic sensor 120a and the second ultrasonic sensor 120b, compare the calculated slope of the ground surface with a threshold, and determine whether the ground surface is suitable for landing.

The plurality of temperature sensors 160 are positioned to correspond to the motors 110a, 110b, 110c, and 110d and the rotor blades 180a, 180b, 180c, and 180d located over the main body 130 and connected to the main body 130. The plurality of temperature sensors 160 measure a temperature of the outside and temperatures of the motors 110a, 110b, 110c, and 110d and the rotor blades 180a, 180b, 180c, and 180d while the UAV 100 is flying or taking-off and landing and transmits information on the measured temperatures to the controller. In this case, the controller may generate a control signal for preventing the UAV 100 from landing when the information on the measured temperatures exceeds reference temperature information and a control signal for preventing the UAV 100 from landing or decreasing a descent speed at which the UAV 100 is landing when an amount of increase in temperature per unit time with respect to the information on the measured temperatures exceeds the predetermined amount of increase.

Sensor protection cases 170a, 170b, 170c, and 170d have truncated circular cone-shaped upper portions that surround the ultrasonic sensors 120a, 120b, 120c, and 120d and cylinder-shaped lower portions. The sensor protection cases 170a, 170b, 170c, and 170d may have a removable structure capable of being replaced in order to protect the plurality of ultrasonic sensors because the plurality of ultrasonic sensors located outside the UAV 100 may be damaged by abrasion caused as a result of a collision with a ground surface whenever the UAV 100 takes off and lands. Accordingly, the sensor protection cases 170a, 170b, 170c, and 170d protect the ultrasonic sensor 120 from an external shock, such as vibration or wind, which is generated when the UAV 100 lands on the ground surface. Also, the sensor protection cases 170a, 170b, 170c, and 170d may be made of synthetic rubber or elastic coil springs. Thus, the sensor protection cases 170a, 170b, 170c, and 170d absorb all shocks generated when the UAV 100 lands on the ground surface and prevent the shocks from being delivered to the ultrasonic sensors 120a, 120b, 120c, and 120d located inside the sensor protection cases 170a, 170b, 170c, and 170d. Accordingly, it is possible to maintain sensitivity and accuracy of the ultrasonic sensors 120 even when the UAV 100 takes off and lands continuously and repeatedly. Furthermore, in addition to the first to fourth ultrasonic sensors, a sensor protection case may also be positioned to surround the fifth ultrasonic sensor 120e located at the center of the main body of the UAV 100 in order to protect the fifth ultrasonic sensor 120e when the UAV 100 takes off and lands on the ground surface. A landing guidance method for a UAV, which has the above-described structure, using ultrasonic waves will be described in detail with reference to FIG. 4.

Figure 4:
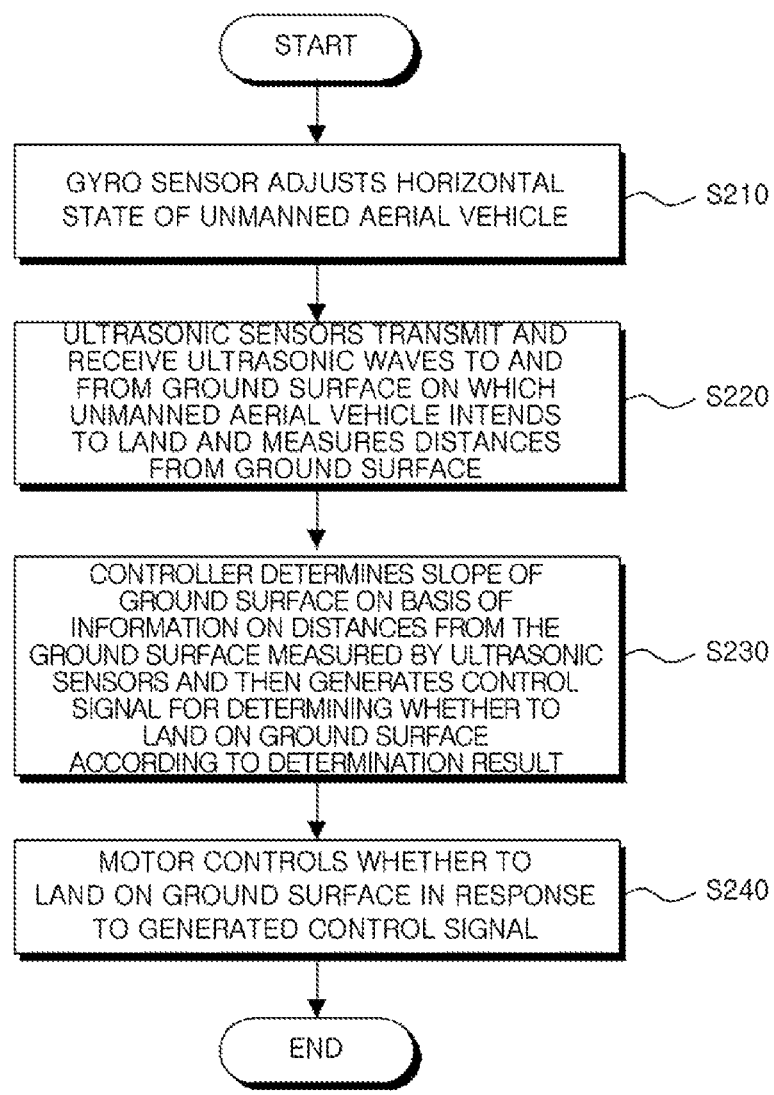
FIG. 4 is a flowchart showing a landing guidance method for a UAV using ultrasonic waves according to another embodiment of the present disclosure.

FIG. 4 is a flowchart showing a landing guidance method for a UAV using ultrasonic waves according to another embodiment of the present disclosure.

As shown in FIG. 4, in the landing guidance method for a UAV according to another embodiment of the present disclosure, the gyro sensor 140 located inside the main body 130 located at the center of the UAV 100 adjusts a horizontal state of the UAV 100 (S210). The gyro sensor 140 may use a three-axis gyro sensor, which may perform setting on three axes that intersect with respect to the UAV 100, measure a change in horizontal movement of the UAV 100 using the three axes, and adjust the horizontal state of the UAV 100.

Thus, the ultrasonic sensors 120a, 120b, 120c, and 120d located under the motors 110a, 110b, 110c, and 110d connected to the plurality of rotor blades 180a, 180b, 180c, and 180d of the UAV 100 having the adjusted horizontal state measure distances from a ground surface for landing by transmitting and receiving ultrasonic waves to and from the ground surface (S220).

Thus, a controller determines a slope of the ground surface on the basis of information on distances from the ground surface measured by the ultrasonic sensors 120a, 120b, 120c, and 120d and then generates a control signal for determining whether to land on the ground surface according to a result of the determination (S230). To this end, the controller may receive information on distances a and b from the ground surface measured by the first ultrasonic sensor 120a and the second ultrasonic sensor 120b, which are paired and positioned facing each other, calculate the slope of the ground surface (or the gradient of the ground surface or a slope angle of the ground surface) using the information on the distance from the ground surface measured by the first ultrasonic sensor 120a, the information on the distance from the ground surface measured by the second ultrasonic sensor 120b, and information on a distance between the first ultrasonic sensor 120a and the second ultrasonic sensor 120b, compare the calculated slope of the ground surface with a threshold, and determine whether the ground surface is suitable for landing.

Subsequently, when the slope θ of the ground surface for landing is less than the predetermined threshold as a result of the comparison, the controller determines that the ground surface has a gradient suitable for landing, generates a corresponding control signal, and transmits the generated control signal to the motors 110. On the other hand, when the slope θ of the ground surface for landing is greater than the predetermined threshold as a result of the comparison, the controller determines that the ground surface is not suitable for the UAV 100 to land on, generates a control signal for maintaining flight rather than landing, and transmits the generated control signal to the motors 110.

It is possible to further enhance accuracy of measuring the slope of the ground surface by using an ultrasonic sensor located between the ultrasonic sensors that face each other, that is, an ultrasonic sensor located under the main body of the UAV 100, in addition to the plurality of ultrasonic sensors located in pairs facing each other when the slope θ of the ground surface for landing is calculated.

The controller may analyze ultrasonic waves received by the ultrasonic sensors and determine whether there is an obstacle on the ground surface on which the UAV 100 intends to land. In this case, when it is determined that an obstacle is present on the ground surface for landing, the controller determines whether the obstacle is fixed on the ground surface or is movable. The controller may not generate a control signal for landing on the ground surface when the obstacle is fixed on the ground surface and may generate the control signal for landing on the ground surface when the obstacle is movable. Also, the possibility of an aerial obstacle being introduced to a descent path during landing cannot be excluded. The controller determines whether an aerial obstacle is present by determining whether a distance from the ground surface correspondingly decreases from a distance before landing is started according to a descent speed through the ultrasonic sensors located under the main body and the motors. In this case, when the sensors measure that a distance from the ground surface decreases rapidly or irregularly, the controller determines that there is an obstacle and controls the motor to hover over the ground surface. Subsequently, the controller may scan the ground surface through the ultrasonic sensors while rotating two or three times about an axis perpendicular to the center of the main body.

Subsequently, the controller may analyze ultrasonic waves received from the ground surface and determine a physical property of the ground surface to determine whether the ground surface is suitable for landing when the slope θ of the ground surface is smaller than the predetermined threshold. That is, the controller may measure acoustic impedance by multiplying the speed of sound by density of the ground surface from which the ultrasonic waves are received. In this case, the controller may determine a type of ground surface by analyzing amplitude of the ultrasonic waves, which varies depending on the acoustic impedance. The controller may generate a control signal for controlling whether the UAV will land according to the determined type of ground surface. In this case, when the ground surface is liquid, the controller may determine that it is impossible for the UAV to land on the ground surface although there is no obstacle and may generate a control signal corresponding to the determination.

Accordingly the motor 110 controls whether the UAV 100 will land on the ground surface in response to the control signal received from the controller (S240).

In addition, even when the UAV 100 is landing on the ground surface, it is possible to repeatedly check whether there is an obstacle on or over the ground surface or whether the obstacle is fixed or movable through the ultrasonic sensors 120a, 120b, 120c, 120d, and 120e of the UAV 100 until the landing of the UAV 100 is complete.

Like this, the ground surface on which the UAV intends to land may have various states. Whether the UAV will land may be determined according to the state of the ground surface.

A process of guiding a landing for each state of the ground surface will be described below in detail with reference to FIG. 5.

Figure 5:
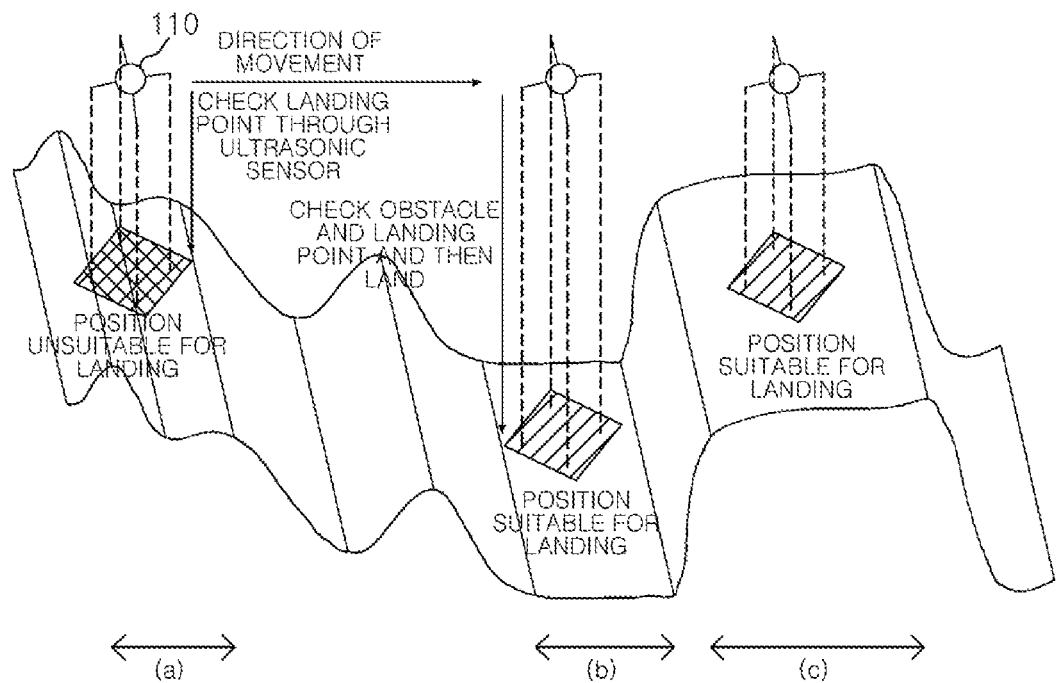
FIG. 5 is a diagram showing a process of scanning a ground condition using an ultrasonic sensor.

FIG. 5 is a diagram showing a process of scanning a state of a ground surface using an ultrasonic sensor.

A ground surface on which a UAV intends to land may have various states, three of which will be described as examples. As shown in FIG. 5, there may be a section in which a ground surface has a steep slope like section (a), there may be a section in which an obstacle is in a portion of a ground surface for landing like section (b), and there may be a section in which a ground surface is flat without any slope and obstacle like section (c).

First, the ground surface in section (a) is characterized by a steep slope. Accordingly, the above-described landing guidance method of the present disclosure includes determining a slope of the ground surface in section (a). In this case, the slope of the ground surface may be determined as not being suitable for the UAV to land on when the slope θ of the ground surface in section (a) is greater than the predetermined threshold. Accordingly, the UAV does not land on the ground surface in section (a) and continues to fly.

Second, the ground surface in section (b) is characterized in that the ground surface does not have a steep slope like section (a) but has an obstacle in a portion thereof. Thus, the landing guidance method of the present disclosure includes measuring a distance from the surface ground in section (b) and then determining a slope of the surface ground in section (b) on the basis of information on the measured distance.

Figure 13:
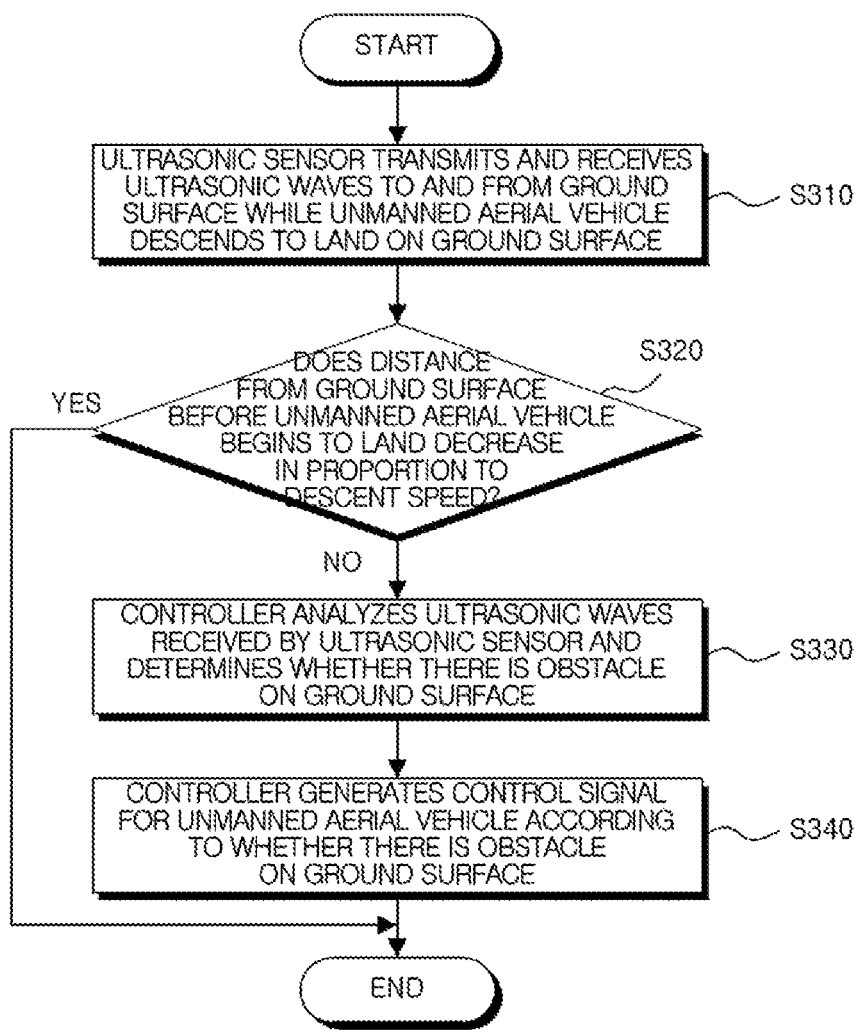
FIG. 13 is a flowchart showing a landing guidance method for a UAV using ultrasonic waves according to another embodiment of the present disclosure.

In this case, the ground surface may be determined as having a slope suitable for the UAV to land on when the slope θ of the ground surface in section (b) is smaller than the predetermined threshold. Subsequently, whether there is an obstacle on the ground surface in section (b) is determined using ultrasonic waves received to determine the slope of the ground surface. The determination of the presence of an obstacle using ultrasonic waves may be achieved by carrying out scanning in a direction of the ground surface using ultrasonic waves to determine that there is an obstacle when an object is scanned in a size range prestored in a database based on information on the scanning direction of the ground surface or to calculate information on an obstacle on the ground or an object between the ground surface and the UAV 100 according to an obstacle determination algorithm prestored in the database. Also, as shown in FIG. 13 below, whether there is an obstacle on the ground surface for landing may be determined by finding out a proportional relation between a descending speed of the UAV 100 and a distance between the UAV 100 and the ground surface. It will be appreciated that any well known techniques for identifying an object on a ground surface in the air may be used as the obstacle determination method. Accordingly, the controller of the UAV generates a control signal for landing on a place other than a location of the obstacle, and the UAV lands on the ground surface in section (b) while avoiding the obstacle in response to the generated control signal.

Third, the ground surface in section (c) is characterized in that the ground surface is flat without a steep slope like section (a) or an obstacle in a portion thereof like section (b). Thus, the landing guidance method of the present disclosure includes measuring a distance from the surface ground in section (c) and then determining a slope of the surface ground in section (c) on the basis of information on the measured distance. In this case, the ground surface may be determined as having a slope suitable for the UAV to land on when the slope θ of the ground surface in section (c) is smaller than the predetermined threshold. Subsequently, the landing guidance method includes determining whether there is an obstacle on the ground surface in section (c) through ultrasonic waves received to determine the slope of the ground surface. When no obstacle is detected on the ground surface in section (c), whether the ground surface in section (c) has a width greater than a whole length of the UAV intending to land is checked through the received ultrasonic waves. When the ground surface in section (c) has a width greater than the whole length of the UAV, the controller finally determines that the ground surface in section (c) is suitable for the UAV to land on, generates a control signal for landing the UAV, and transmits the generated control signal to the motors. Thus, the UAV smoothly lands on the ground surface in section (c).

As described above, in order for the UAV to land on a ground surface, the distance between the UAV and the ground surface and a slope of the ground surface are measured first. A process of measuring a slope (i.e., a gradient) of a ground surface will be described below in detail with reference to FIGS. 6 to 8.

Figure 6:
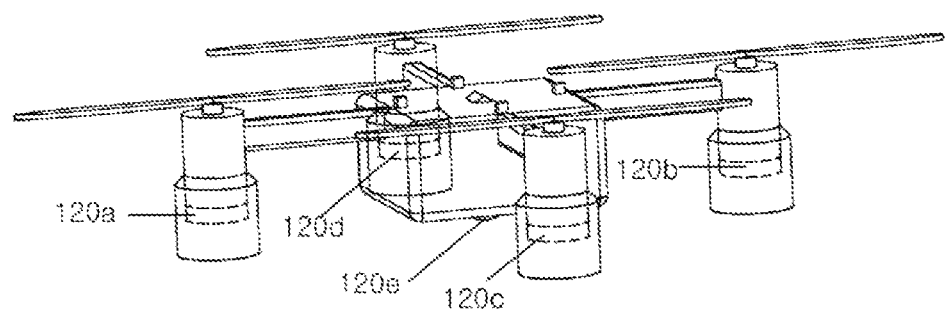
FIG. 6 is a perspective view showing an arrangement structure of ultrasonic sensors in a UAV.
Figure 7:
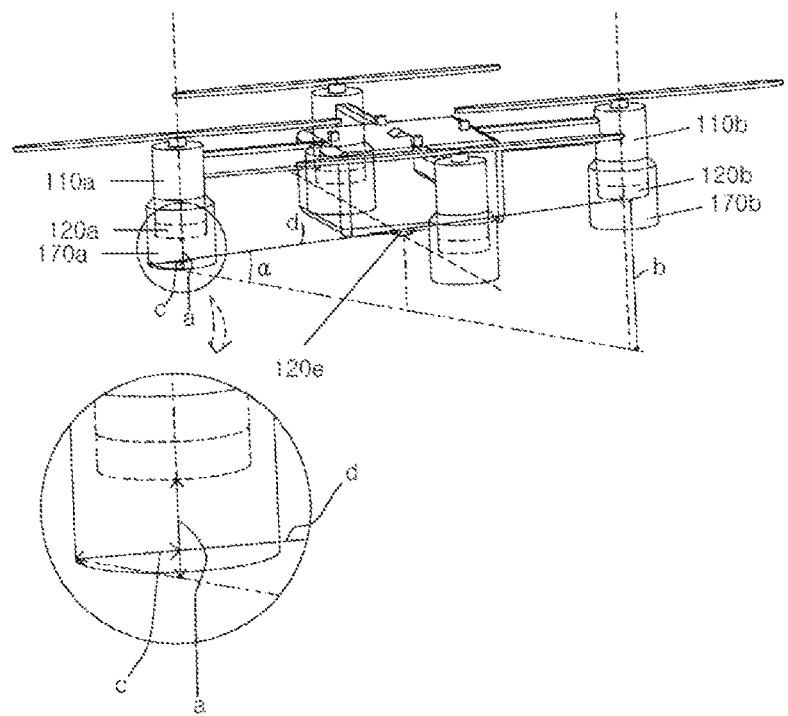
FIG. 7 is a diagram showing a process of measuring a tangent of a gradient $\theta$ of a ground surface.
Figure 8:
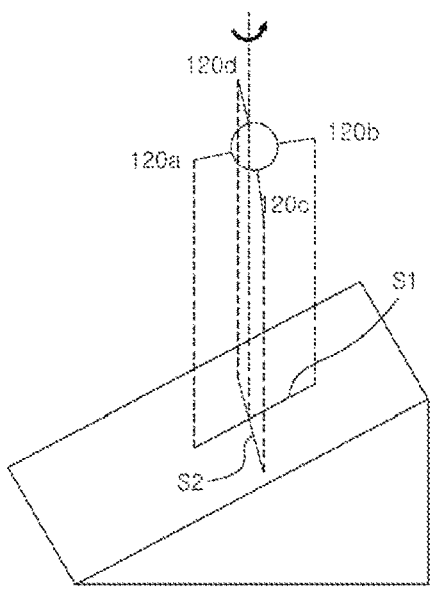
FIG. 8 is a diagram showing a process of measuring a gradient of a ground surface while a UAV rotates 360 degrees over the ground surface.

FIG. 6 is a perspective view showing an arrangement structure of ultrasonic sensors in a UAV, FIG. 7 is a diagram showing a process of measuring a tangent of a gradient of a ground surface, and FIG. 8 is a diagram showing a process of measuring a gradient of a ground surface while a UAV rotates 360 degrees over the ground surface.

As shown in FIGS. 6 to 8, the main body 130 is located at the center of the UAV 100, a total of four rotor blades 180a, 180b, 180c, and 180d are located in four directions radially from the main body 130, and the motors 110a, 110b, 110c, and 110d for rotating the rotor blades 180a, 180b, 180c, and 180d are respectively connected to the rotor blades 180a, 180b, 180c, and 180d. Accordingly, a total of four motors 110a, 110b, 110c, and 110d are positioned. The ultrasonic sensors 120a, 120b, 120c, 120d, and 120e are located under the four motors 110a, 110b, 110c, and 110d under the main body 130. In this case, serial numbers are pre-allocated and set for the ultrasonic sensors 120a, 120b, 120c, 120d, and 120e. For example, when the four ultrasonic sensors 120a, 120b, 120c, and 120d are located under the plurality of motors 110a, 110b, 110c, and 110d of the UAV 100, an ultrasonic sensor located at the left-most side may be set as the first ultrasonic sensor 120a, and an ultrasonic sensor positioned facing the first ultrasonic sensor 120a may be set as the second ultrasonic sensor 120b. Also, an ultrasonic sensor located at the front-most side is set as the third ultrasonic sensor 120c, and an ultrasonic sensor positioned facing the third ultrasonic sensor 120c is set as the fourth ultrasonic sensor 120d. Also, an ultrasonic sensor located under the main body 130 is set as the fifth ultrasonic sensor 120e.

In the UAV 100 in which the ultrasonic sensors 120 are installed in this way, the controller receives information on distances from the ground surface measured by the first ultrasonic sensor 120a and the second ultrasonic sensor 120b, which are paired and positioned facing each other. In this case, the information on the distance from the ground surface measured by the first ultrasonic sensor 120a is a, and the information on the distance from the ground surface measured by the second ultrasonic sensor 120b is b.

The controller checks distance information a, which indicates the information on the distance from the ground surface measured by the first ultrasonic sensor 120a, distance information b, which indicates the information on the distance from the ground surface measured by the second ultrasonic sensor 120b, and distance information c, which indicates information on a distance between the first ultrasonic sensor 120a and the second ultrasonic sensor 120b.

The controller may measure the slope θ of the ground surface by using the tangent of the slope θ of the ground surface obtained by subtracting the distance a from the ground surface measured by the first ultrasonic sensor 120a from the distance b from the ground surface measured by the second ultrasonic sensor 120b and then dividing the difference by the distance c between the first ultrasonic sensor 120a and the second ultrasonic sensor 120b.

When the tangent of the slope θ of the ground surface for landing is smaller than the predetermined threshold, the controller determines that the ground surface has a gradient suitable for landing, generates a control signal for landing, and transmits the generated control signal to the motors, and thus the UAV carries out landing on the ground surface.

Thus, in the above-described S230 in which the controller determines the slope of the ground surface on the basis of information on the distances from the ground surface measured by the ultrasonic sensors in the above-described S230 and then generates a control signal for instructing the UAV having the adjusted horizontal state to land on the ground surface, the controller may guide the landing of the UAV according to a roughness of the ground surface as well as the slope of the ground surface.

First, the controller receives information on distances from the ground surface measured by the first ultrasonic sensor 120a and the second ultrasonic sensor 120b, which are paired and located facing each other, among the plurality of ultrasonic sensors in order to determine the roughness of the ground surface.

The controller checks information on a distance from the bottom end of the first sensor protection case 170a disposed to surround the first ultrasonic sensor 120a to the center of the first ultrasonic sensor 120a.

The controller may calculate the slope of the ground surface (or the gradient of the ground surface or a slope angle of the ground surface) using the information on the distance from the ground surface measured by the first ultrasonic sensor 120a, the information on the distance from the ground surface measured by the second ultrasonic sensor 120b, and information on a distance between the first ultrasonic sensor 120a and the second ultrasonic sensor 120b, compare the calculated slope of the ground surface with a threshold, and determine whether the ground surface is suitable for landing.

However, while the gradient of the ground surface is measured in this way, a gradient S1 of the ground surface acquired through the first ultrasonic sensor 120a and the second ultrasonic sensor 120b may be different from a gradient S2 of the ground surface acquired through the third ultrasonic sensor 120c and the fourth ultrasonic sensor 120d, as shown in FIG. 8. For example, when the gradient S1 of the ground surface acquired through the first ultrasonic sensor 120a and the second ultrasonic sensor 120b is an accurate gradient of the ground surface on which the UAV intends to land, the gradient S2 of the ground surface acquired through the third ultrasonic sensor 120c and the fourth ultrasonic sensor 120d should be close to "0." That is, when a tangent, which is a gradient measured through a pair of two ultrasonic sensors that face each other, is measured as "0," a gradient measured through the other pair of two ultrasonic sensors that face each other may be determined as an actual gradient of the ground surface. This is possible because segments formed from the center of the main body through a plurality of ultrasonic sensors that face each other are orthogonal to each other.

Figure 9A:
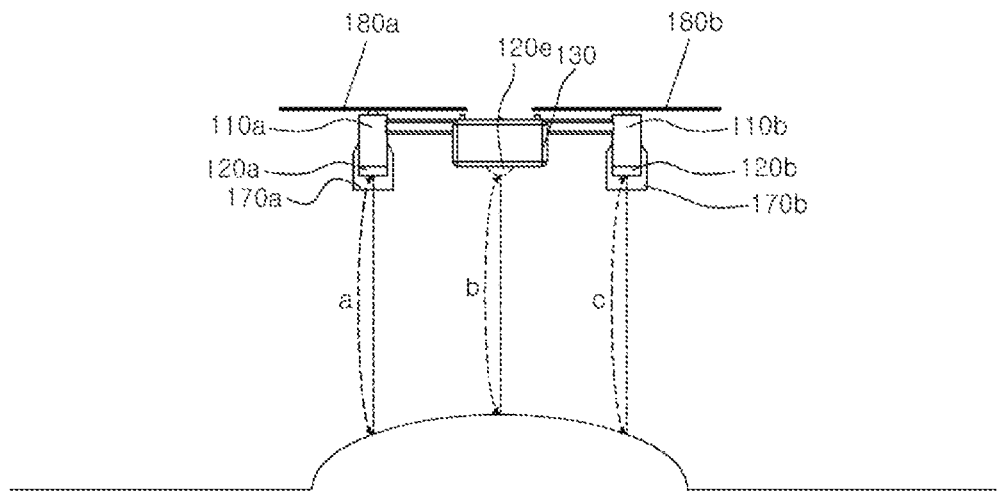
FIG. 9A and FIG. 9B are diagrams showing a slope of a convex ground surface.
Figure 9B:
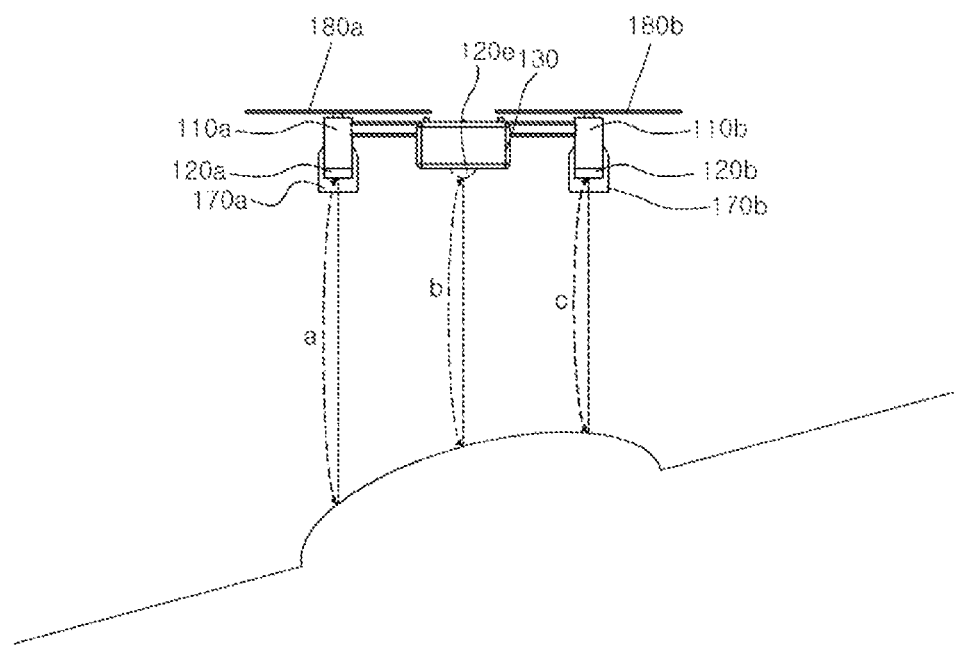

By measuring the slope of the ground surface, the controller may determine whether the ground surface is flat or has a steep gradient as shown in FIG. 9A and FIG. 9B. To this end, the first ultrasonic sensor 120*a* and the second ultrasonic sensor 120*b* disposed to face each other and the fifth ultrasonic sensor 120*e* located under the main body 130 located at the center of the UAV transmit and receive ultrasonic waves to and from the ground surface and measure the distances a, c, and b from the ground surface.

In this case, as shown in FIG. 9A, when a difference between the distance b measured through the fifth ultrasonic sensor 120*e* and the distance c measured through the second ultrasonic sensor 120*b* is smaller than a predetermined distance difference (b≈c) and a difference between the distance a measured through the first ultrasonic sensor 120*a* and the distance c measured through the second ultrasonic sensor 120*b* is smaller than a predetermined distance difference (a≈c), the controller may determine that the ground surface has a flat gradient and generate a control signal to instruct the UAV to land on the ground surface.

On the other hand, however, when the difference between the distance b measured through the fifth ultrasonic sensor 120*e* and the distance c measured through the second ultrasonic sensor 120*b* is smaller than the predetermined distance difference (b≈c) and the difference between the distance a measured through the first ultrasonic sensor 120*a* and the distance c measured through the second ultrasonic sensor 120*b* is greater than the predetermined distance difference (a>>c), the controller may determine that the ground surface has a steep gradient and the UAV is very likely to turn over while landing on the ground surface. Accordingly, the controller may generate a control signal to prevent the UAV from landing on the ground surface.

After measuring the gradient of the ground surface, the controller further measures whether a specified point (a reference point) of the ground surface toward which the UAV intends to descend is convex or concave.

To this end, the controller chooses, as the reference point, any point of the ground surface (i.e., a point in a normal direction of the center of the UAV) to and from which the fifth ultrasonic sensor 120*e* located under the main body at the center of the UAV transmits and receives ultrasonic waves. Then, the UAV rotates two or three times around the reference point chosen by the UAV and measures gradients of points of the ground surface around the reference point.

Subsequently, the controller may determine a roughness of the reference point, that is, whether the reference point is convex or concave, on the basis of the measured gradients of the points of the ground surface around the reference point.

Figure 10A:
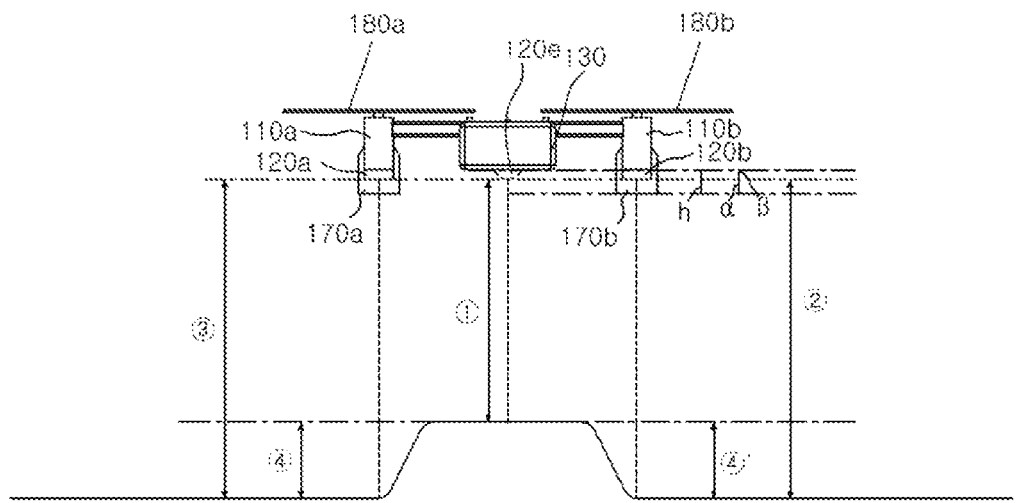
FIG. 10A and FIG. 10B are diagrams showing an example in which a convex state of any reference point of a ground surface is more or less convex than a predetermined convexity threshold.
Figure 10B:
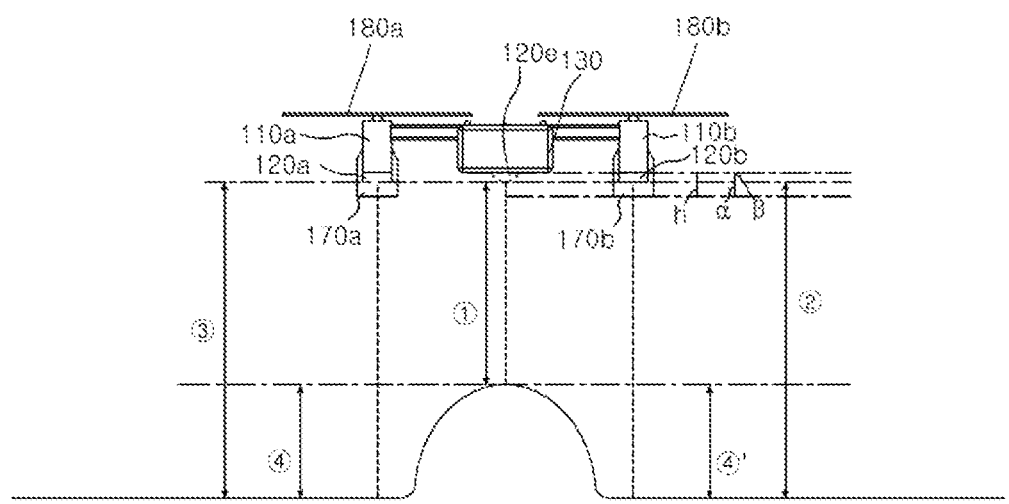

FIG. 10A and FIG. 10B are diagrams showing an example in which a convex state of any reference point of a ground surface is more or less convex than a predetermined convexity threshold.

As shown in FIG. 10A, in order to measure gradients of points of a ground surface around a reference point, that is, a point of the ground surface to and from which ultrasonic waves are transmitted and received by the fifth ultrasonic sensor 120*e*, information on a distance measured by each ultrasonic sensor is set as a number.

For example, a ground surface distance measured through ultrasonic waves transmitted or received by the fifth ultrasonic sensor 120*e* located at the center of the UAV is set as a distance ①, a distance from the ground surface measured through ultrasonic waves transmitted or received by the second ultrasonic sensor 120*b* is set as a distance ②, and a distance from the ground surface measured through ultrasonic waves transmitted or received by the first ultrasonic sensor 120*a* is set as a distance ③. In this case, α indicates a different in height between a bottom of the ultrasonic sensor 120*b* located under the motor 110*b* and a bottom of the sensor protection case 170*b* positioned to surround the ultrasonic sensor 120*b*, and β indicates a difference between a height of the first and second ultrasonic sensors 120*a* and 120*b* and a height of the fifth ultrasonic sensor 120*e*. In this case, it may be determined that the reference point protrudes from the ground surface, that is, is convex, through a comparison between the distance ② and distances ③ and ④.

In this case, a convex height of the reference point protruding from the ground surface is set as the distance ④. However, since the ground surface may not be flat, a convex height of a reference point located at the first ultrasonic sensor side is set as the distance ④, and a convex height of a reference point located at the second ultrasonic sensor side located opposite the first ultrasonic sensor is set as a distance ④'.

Also, a convexity threshold of the reference point is α+β(=h). When α+β(=h), which is the convexity threshold of the reference point, is greater than the distance ④, which is the convex height of the reference point located at the first ultrasonic sensor 120*a* side and the distance ④', which is the convex height of the reference point located at the second ultrasonic sensor 120*b* side, and also greater than a convex height of a reference point located at the third ultrasonic sensor 120*c* side (not shown) and a convex height of a reference point located at the fourth ultrasonic sensor 120*d* side (not shown), a convex height of the ground surface around the reference point may be determined as being suitable for the UAV to land on.

Here, the convex heights of the reference points located at sides of the plurality of sensors may be calculated using the same method. A method of calculating the convex height of the reference point located at the first ultrasonic sensor 120*a* side will be described as an example.

The height of the reference point located at the first ultrasonic sensor 120*a* side is the absolute value of a value obtained by subtracting the distance ① measured through the fifth ultrasonic sensor 120*e* from the distance ③ measured through the first ultrasonic sensor 120*a* and then adding β, which is a difference between a height of the first to fourth ultrasonic sensors 120*a*, 120*b*, 120*c*, and 120*d* and a height of the fifth ultrasonic sensor 120*e*, to the difference.

The height of the reference point may refer to a difference between distances from the centers of the plurality of ultrasonic sensors to the ground surface located directly under the plurality of ultrasonic sensors.

On the other hand, the convex height of the ground surface around the reference point may exceed the threshold.

As shown in FIG. 10B, when α+β(=h), which is the convexity threshold of the reference point, is equal to or less than the distance ④, which is the convex height of the reference point located at the first ultrasonic sensor 120*a* side, the current convex height of the ground surface around the reference point exceeds the convexity threshold. Thus, the convex height may be determined as not being suitable for the UAV to land on.

Alternatively, when α+β(=h), which is the convexity threshold of the reference point, is equal to or less than the distance ④', which is the convex height of the reference point located at the second ultrasonic sensor 120*b* side, the convex height of the ground surface around the reference point may be determined as not being suitable for the UAV to land on.

Unlike this, whether the reference point is recessed from the ground surface, that is, is concave, may be determined by comparing the distance ① measured through the fifth ultrasonic sensor 120*e* and the distance ② measured through the second ultrasonic sensor 120*b* or the distance ③ measured through the first ultrasonic sensor 120*a*.

Figure 11A:
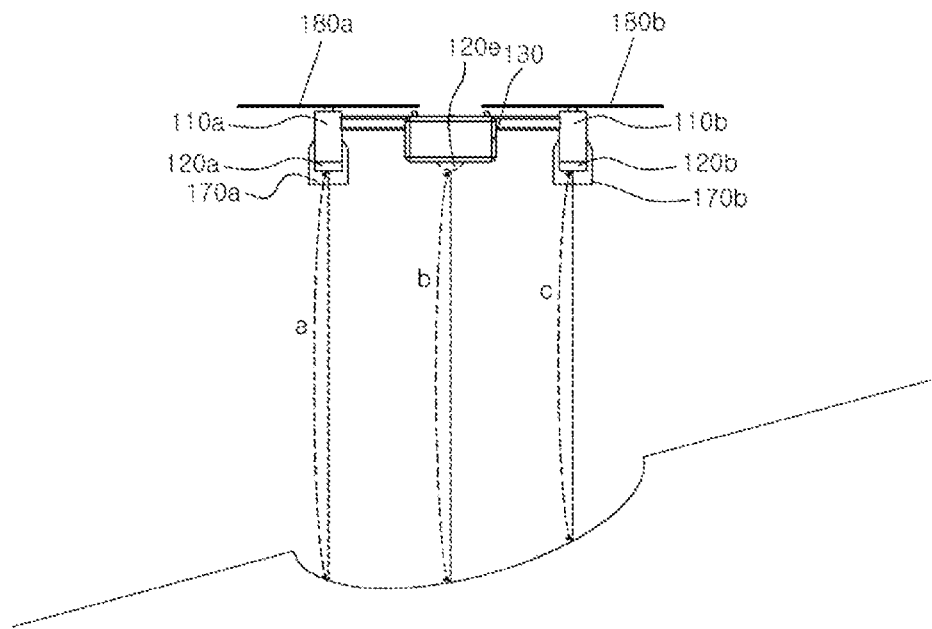
FIG. 11A and FIG. 11B are diagrams showing a gradient of a concave ground surface.
Figure 11B:
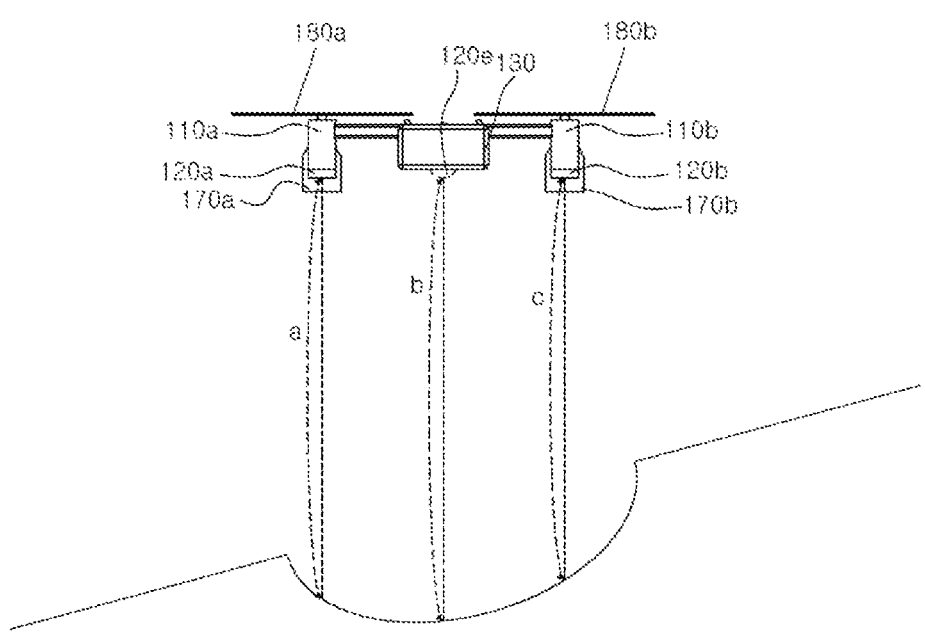

FIG. 11A and FIG. 11B are diagrams showing a slope of a concave ground surface.

As shown in FIG. 11A, when a difference between the distance a from the ground surface measured through the first ultrasonic sensor 120*a* and the distance b from the ground surface measured through the fifth ultrasonic sensor 120*e* is less than the predetermined distance difference (a≈b), the controller may determine that the UAV can land on the reference point of the ground surface.

However, as shown in FIG. 11B, when the difference between the distance a measured through the first ultrasonic sensor 120*a* and the distance c measured through the second ultrasonic sensor 120*b* is greater than the predetermined distance difference (a>>c), the ground surface may be determined to have a steep slope. Thus, the controller may determine that the UAV is very likely to turn over when the UAV lands on the ground surface and may generate a control signal to prevent the UAV from landing on the ground surface and find another ground surface for landing.

Figure 12A:
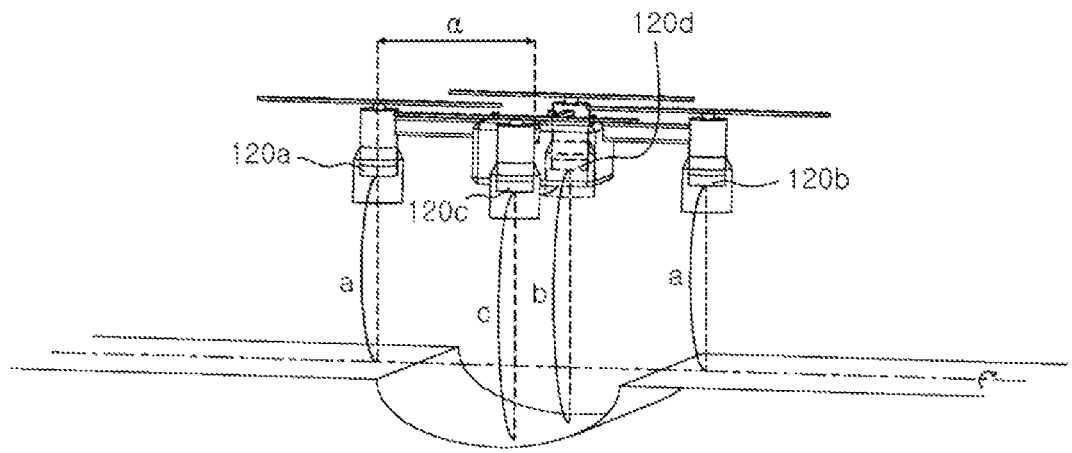
FIG. 12A and FIG. 12B are diagrams showing an example in which any reference point of a ground surface is more or less concave than a predetermined concavity threshold.
Figure 12B:
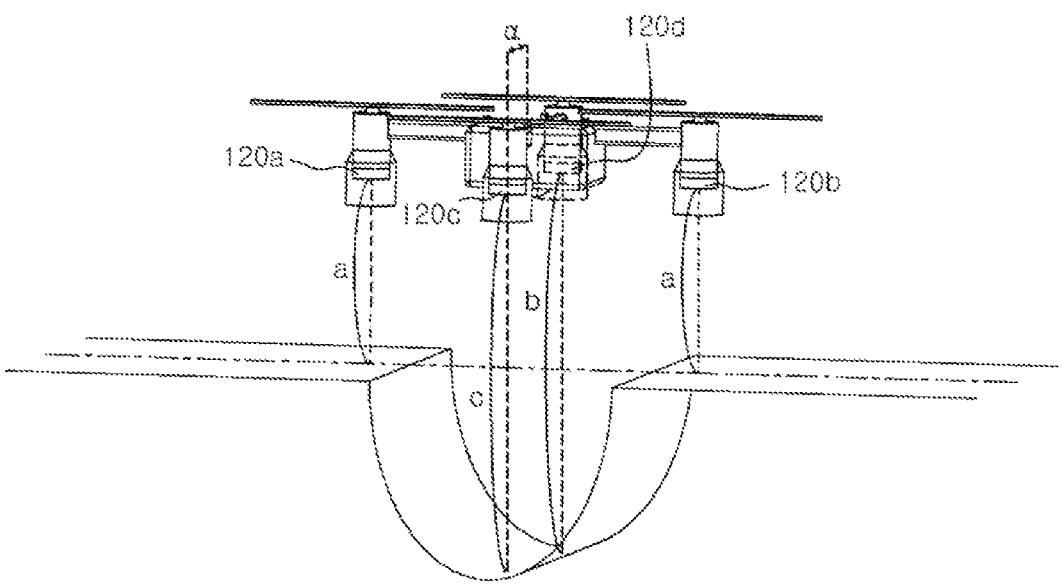

FIG. 12A and FIG. 12B are diagrams showing an example in which a concave state of any reference point of a ground surface is more or less concave than a predetermined concavity threshold.

As shown in FIG. 12A, with respect to the reference point of a concave ground surface, a ground surface distance measured through the first ultrasonic sensor 120*a* or the second ultrasonic sensor 10*b* is set as a, a distance from the ground surface measured through the third ultrasonic sensor is set as c, and a distance from the ground surface measured through the fourth ultrasonic sensor is set as d. In this case, a distance between the center of the first ultrasonic sensor 120*a* and the center of the fifth ultrasonic sensor 120*e* located at the center of the main body of the UAV is set as α. In this case, the concavity threshold indicates a length from the center of the main body of the UAV to the third ultrasonic sensor or the fourth ultrasonic sensor.

In this case, when the absolute value of a value obtained by subtracting the distance b measured through the fourth ultrasonic sensor from the distance a measured through the first or second ultrasonic sensor is less than the distance a between the center of the first ultrasonic sensor and the center of the fifth ultrasonic sensor located at the center of the main body of the UAV, the reference point is not too concave. Accordingly, since the UAV will not turn over when the UAV lands on the reference point, the controller may determine that the unmanned aerial vehicle can land and generate a control signal for landing.

Alternatively, even when the absolute value of a value obtained by subtracting the distance a measured through the first or second ultrasonic sensor from the distance c measured through the third ultrasonic sensor is less than the distance a between the center of the first ultrasonic sensor and the center of the fifth ultrasonic sensor located at the center of the main body of the UAV, the reference point is not too concave. Accordingly, since the UAV will not turn over even when the UAV lands on the reference point, the controller may determine that the UAV can land and generate the control signal for landing.

However, as shown in FIG. 12B, the reference point may be more concave than the threshold. In this case, when the absolute value of a value obtained by subtracting the distance b measured through the fourth ultrasonic sensor from the distance a measured through the first or second ultrasonic sensor is greater than or equal to the distance a between the center of the first ultrasonic sensor and the center of the fifth ultrasonic sensor located at the center of the main body of the UAV, the UAV is likely to turn over while the UAV is landing on the reference point, and thus the controller may determine that landing is impossible.

Alternatively, when the absolute value of a value obtained by subtracting the distance c measured through the third ultrasonic sensor from the distance a measured through the first or second ultrasonic sensor is greater than or equal to the distance a between the center of the first ultrasonic sensor and the center of the fifth ultrasonic sensor located at the center of the main body of the UAV, the UAV is also likely to turn over while the UAV is landing on the reference point, and thus the controller may determine that landing is impossible. Subsequently, the controller may generate a control signal for flying to find another ground surface for landing.

A process of determining an obstacle that may occur while a UAV descends to land on a ground surface will be described below in detail with reference to FIGS. 13 to 17.

Figure 14:
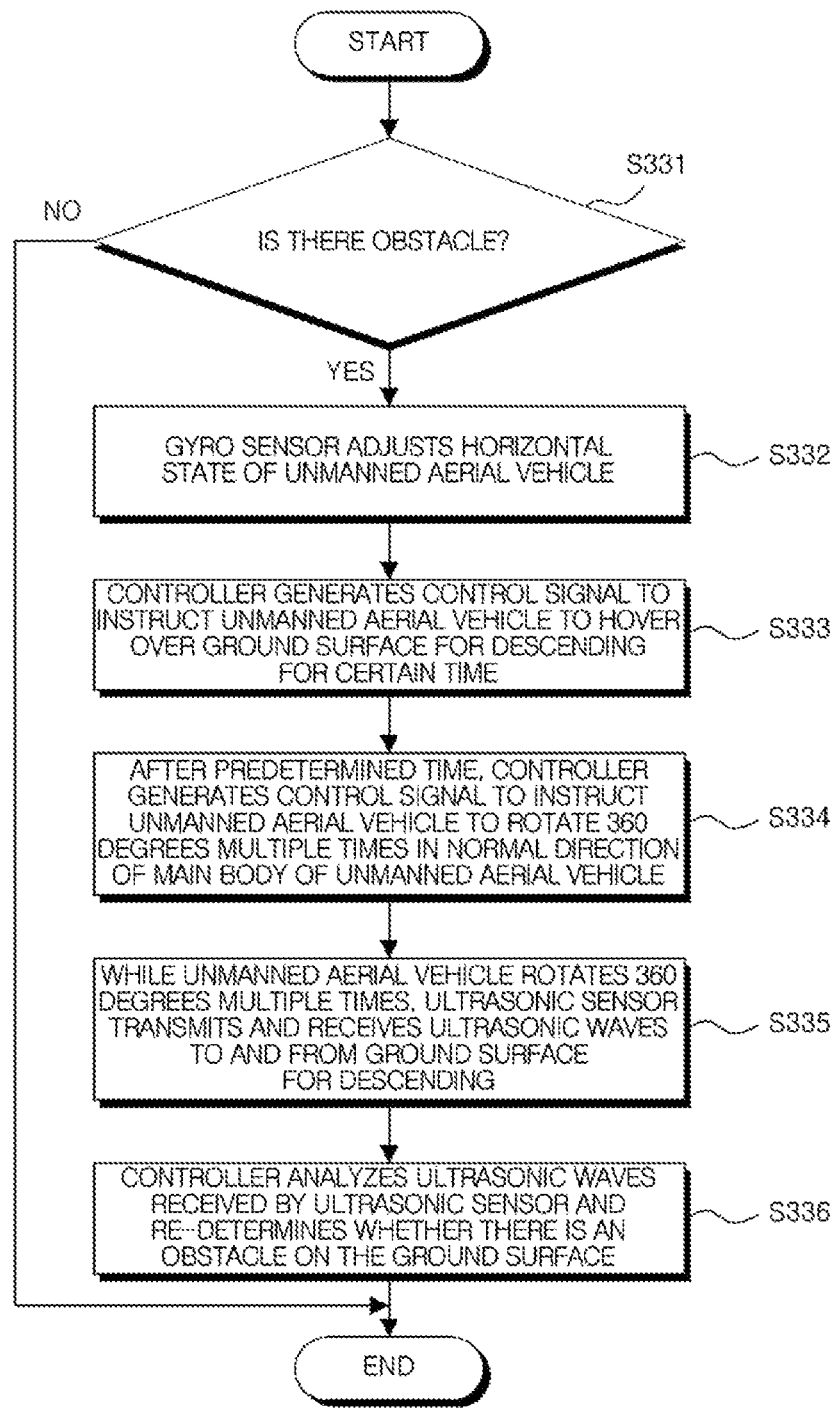
FIG. 14 is a flowchart showing a method of determining whether an obstacle is present on a ground surface.
Figure 15:
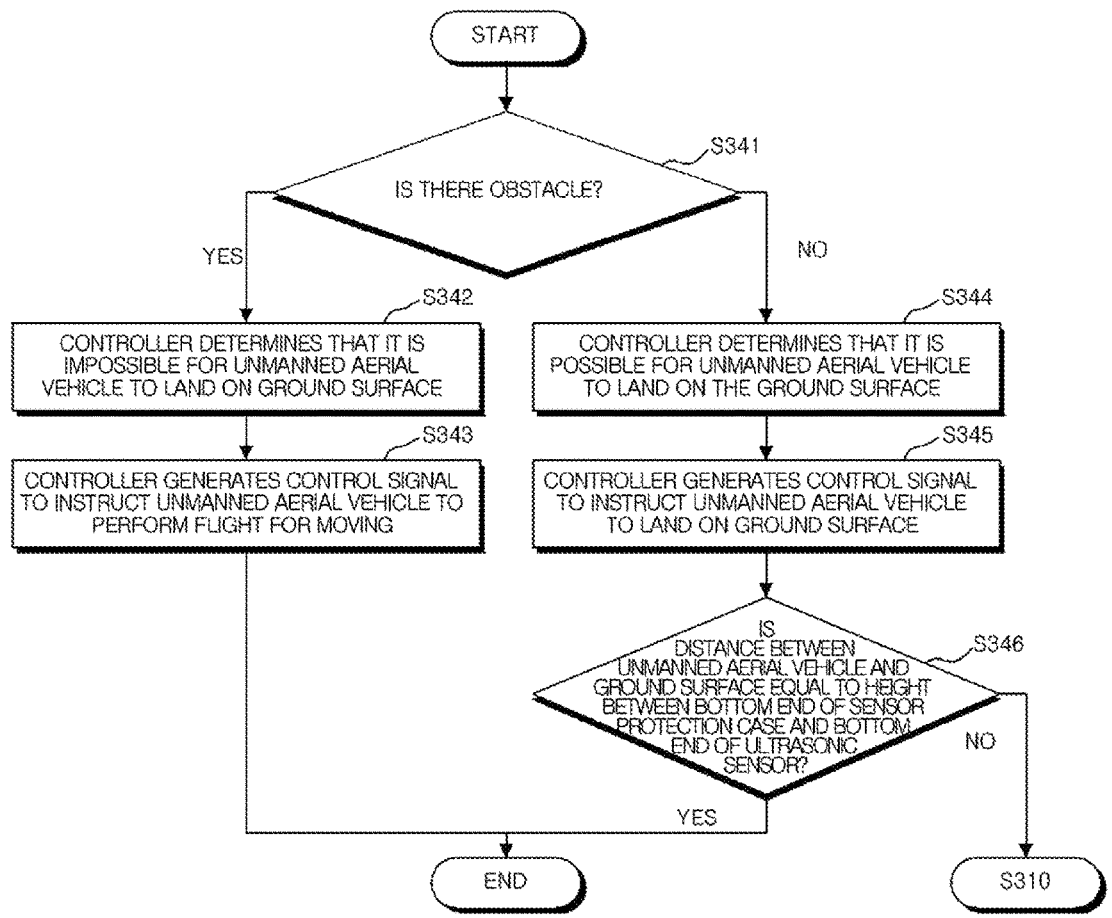
FIG. 15 is a flowchart showing a method of generating a control signal for a UAV according to whether an obstacle is present on a ground surface.
Figure 16A:
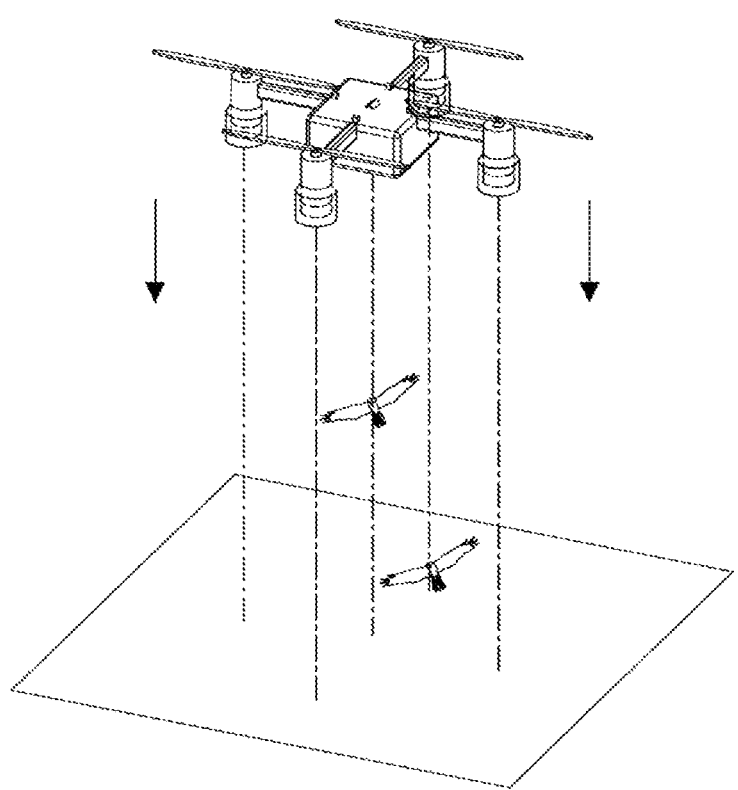
FIG. 16A, FIG. 16B, and FIG. 16C are schematic diagrams showing a descending process according to whether an obstacle is present on a ground surface during descent of a UAV to the ground surface.
Figure 16B:
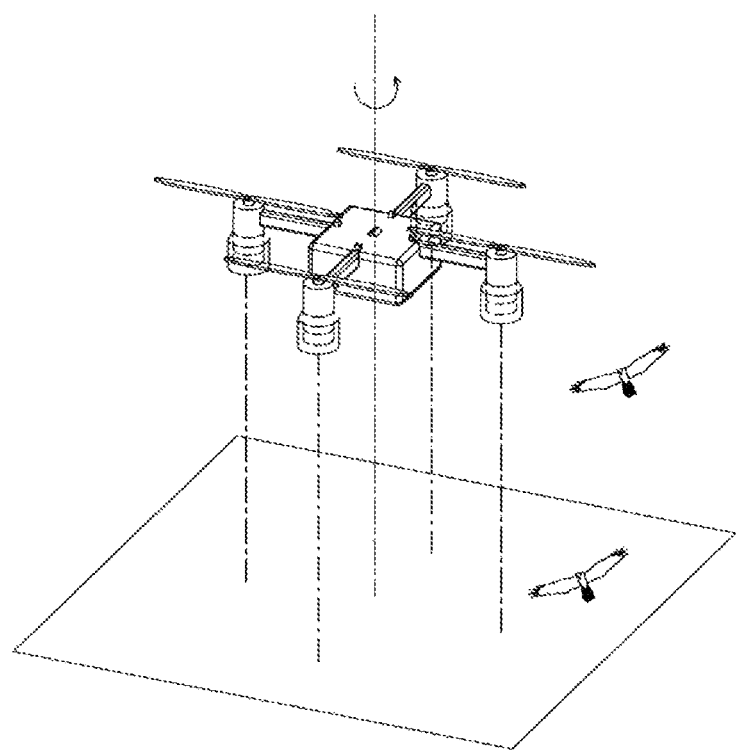
Figure 16C:
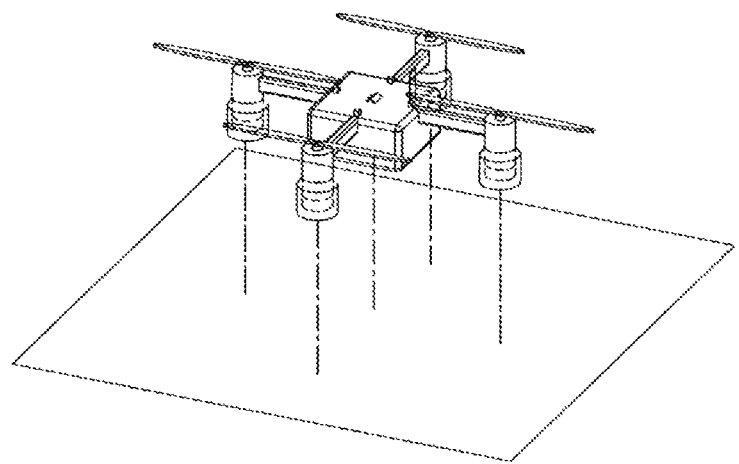
Figure 17:
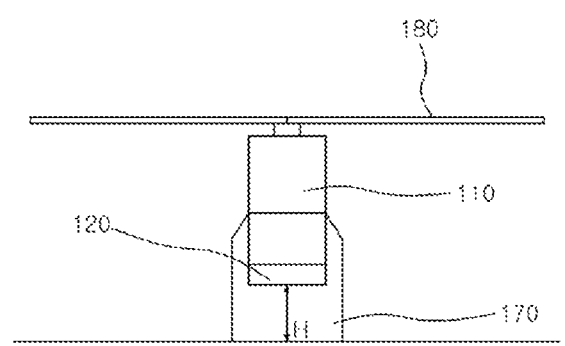
FIG. 17 is a diagram showing a state between a UAV and a ground surface when an obstacle determination process is complete.

FIG. 13 is a flowchart showing a landing guidance method for a UAV using ultrasonic waves according to another embodiment of the present disclosure, FIG. 14 is a flowchart showing a method of determining whether an obstacle is present on a ground surface, FIG. 15 is a flowchart showing a method of generating a control signal for a UAV according to whether an obstacle is present on a ground surface, FIG. 16A, FIG. 16B, and FIG. 16C are schematic diagrams showing a descending process according to whether an obstacle is present on a ground surface during descent of a UAV to the ground surface, and FIG. 17 is a diagram showing a state between a UAV and a ground surface when an obstacle determination process is complete.

As shown in FIG. 13, when the UAV descends to land on the ground surface, an ultrasonic sensor transmits and receives ultrasonic waves to and from the ground surface during the descent (S310).

Subsequently, a controller analyzes the ultrasonic waves transmitted and received through the ultrasonic sensor and checks whether a distance from the ground surface before the UAV begins to land decreases in proportion to a descent speed (S320).

When the distance from the ground surface before the UAV begins to land does not decrease in proportion to the descent speed but decreases rapidly or irregularly, the controller analyzes the received ultrasonic waves and determines whether there is an obstacle between the UAV and the ground surface (S330).

Subsequently, the controller generates a control signal for the UAV according to whether there is an obstacle on the ground surface (S340).

For example, as shown in FIG. 16A, the controller may determine whether there is an obstacle (e.g., a bird) at a point between the UAV and the ground surface or a point on the ground surface.

As shown in FIG. 14, the controller determines whether there is an obstacle (e.g., a bird) at a point between the UAV and the ground surface or a point on the ground surface (S331). In this case, when it is determined that there is an obstacle (e.g., a bird) at a point between the UAV and the ground surface or a point on the ground surface, a gyro sensor adjusts a horizontal state of the UAV again (S332).

Subsequently, the controller generates a control signal to instruct the UAV to stop descending toward the ground surface and hover over the ground surface for a certain time (S333).

Subsequently, after a predetermined time, the controller generates a control signal to instruct the UAV to rotate multiple times about an axis perpendicular to the main body of the UAV, as shown in FIG. 16B (S334).

While the UAV rotates multiple times, the ultrasonic sensor transmits and receives ultrasonic waves to and from the ground surface for descending (S335).

Accordingly, the controller analyzes the ultrasonic waves received by the ultrasonic sensor and re-determines whether there is an obstacle on the ground surface (S336).

A process in which the controller re-determines whether there is an obstacle on a ground surface and generates a control signal for a UAV will be described below in detail with reference to FIG. 15.

When it is determined that there is an obstacle on the ground surface (S341), the controller determines that it is impossible for the UAV to land on the ground surface (S342).

Subsequently, the controller generates a control signal to instruct the UAV to perform flight for moving rather than landing on the ground surface (S343).

However, when the controller determines that there is no obstacle on the ground surface in S341, the controller determines that the ground surface is suitable for the UAV to land on (S344) and generates a control signal to instruct the UAV to land on the ground surface (S345), as shown in FIG. 16C.

Subsequently, as shown in FIG. 17, the controller determines whether a distance between the UAV and the ground surface is equal to a height H between a bottom end of a sensor protection case 170 and a bottom end of the ultrasonic sensor 120 (S346).

In this case, when the distance between the UAV and the ground surface is not equal to the height H between the bottom end of the sensor protection case 170 and the bottom end of the ultrasonic sensor 120, the controller determines that the landing on the ground surface is not complete and performs S310, that is, that the process in which the ultrasonic sensor transmits and receives ultrasonic waves to and from the ground surface for descending will be performed again.

On the other hand, when the distance between the UAV and the ground surface is equal to the height H between the bottom end of the sensor protection case 170 and the bottom end of the ultrasonic sensor 120, the controller determines that the UAV has smoothly landed on the ground surface.

In addition, the controller may analyze ultrasonic waves received from the ground surface and determine a physical property of the ground surface in order to determine whether the ground surface is suitable for landing when a tangent of a slope of the ground surface is determined as "0." That is, the controller may measure acoustic impedance by multiplying the speed of sound by a density of the ground surface from which the ultrasonic waves are received. In this case, the controller may determine a type of the ground surface by analyzing amplitude of the ultrasonic waves, which varies depending on the acoustic impedance. The controller may generate a control signal for controlling whether the UAV will land according to the determined type of the ground surface. In this case, when the ground surface is liquid, the controller may determine that the UAV cannot land although there is no obstacle, and may generate a control signal corresponding to the determination.

According to an aspect of the present disclosure, it is possible to guide a smooth landing of a UAV on a ground surface by predetermining a situation in which landing the UAV is impossible, for example, a case in which the ground surface is not even, has a severe slope, or has a width smaller than a whole length of the UAV.

Embodiments of the present disclosure may be implemented as program instructions executable by a variety of computers and recorded on a computer-readable medium. The computer-readable medium may also include a program instruction, a data file, a data structure, or combinations thereof. The program instruction recorded in the medium may be designed and configured specially for the present disclosure or can be publicly known and available to those skilled in the field of computer software. Examples of the computer-readable medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device such as a read-only memory (ROM), a random access memory (RAM), a flash memory, etc. Examples of the program instructions include not only machine code generated by a compiler or the like but also high-level language codes that may be executed by a computer using an interpreter or the like. The above hardware device can be configured to operate as at least one software module in order to perform operations of embodiments of the present disclosure, and vice versa.

While an example embodiment of the present disclosure is disclosed for the purpose of illustration, it should be understood by those of ordinary skill in the art that various modifications, changes, additions, or the like can be made therein without departing from the spirit and scope as defined by the following claims.

What is claimed is:

1. An unmanned aerial vehicle (UAV) comprising:
a main body;
a plurality of motors connected to the main body, each of the plurality of motors having a rotor blade;
a plurality of ultrasonic sensors located at least one of the plurality of motors and the main body, and transmitting and receiving ultrasonic waves to and from a ground surface, and measuring distances from the ground surface;
a gyro sensor disposed at the main body and maintaining the UAV in a horizontal state; and
a controller disposed at the main body, detecting an unevenness of the ground surface based on the distances from the plurality of ultrasonic sensors to the ground surface, generating a control signal whether to land on the ground surface or not in response to the detection of the unevenness, and transmitting the control signal to the plurality of motors.

2. The UAV of claim 1, wherein the plurality of motors are connected to the main body via connection bars, and the plurality of ultrasonic sensors are located underneath the plurality of motors, the connection bars, and main body.

3. The UAV of claim 1, further comprising sensor protection cases disposed at the plurality of motors to surround the plurality of ultrasonic sensors.

4. The UAV of claim 3, wherein the sensor protection cases are made of synthetic rubber or coil springs.

5. The UAV of claim 1, wherein the plurality of ultrasonic sensors includes a first ultrasonic sensor and a second ultrasonic sensor, the first ultrasonic sensor and the second ultrasonic sensor are spaced apart on the UAV by a sensor distance (DS), the first ultrasonic sensor measures a first distance (D1) from the first ultrasonic sensor to the ground surface, the second ultrasonic sensor measures a second distance (D2) from the second ultrasonic sensor to the ground surface; and the controller receives distance information including the sensor distance (DS), the first distance (D1), and the second distance (D2), calculates a slope of the ground surface, and determines a landing if the slope of the ground surface is within a predetermined range.

6. The UAV of claim 5, wherein when the first ultrasonic sensor and the second ultrasonic sensor measures the first and second distances (D1 and D2) respectively, the UAV is in a horizontal state.

7. The UAV of claim 5, wherein a perpendicular foot is drawn from the main body onto the ground surface, the main body rotates with respect to the perpendicular foot at a different angle, the first ultrasonic sensor and the second ultrasonic sensor measure the first and second distances (D1 and D2) for each of the different angle.

8. The UAV of claim 7, wherein the main body rotates with respect to the perpendicular foot more than 360°.

9. The UAV of claim 1, wherein each of the motors is a stepping motor or a servo motor.

10. The UAV of claim 1, further comprising a plurality of temperature sensors located on the main body and measuring internal or external temperature of the UAV.

11. The UAV of claim 1, wherein the plurality of ultrasonic sensors includes a first ultrasonic sensor and a center ultrasonic sensor, the plurality of motors include a first motor, the first ultrasonic sensor is located underneath the first motor and surrounded by a first sensor protection case, and the center ultrasonic sensor is located underneath the main body, wherein α refers to a distance from one end of the first sensor protection case to the first ultrasonic sensor, β refers to a distance from one end of the first ultrasonic to the center ultrasonic sensor in a vertical direction, a threshold reference height (TRH) is obtained by the following equation: TRH=α+β, and wherein if the threshold reference height (TRH) is greater than a height of the ground (HG), the controller generates the control signal to land on the ground surface.

12. The UAV of claim 11, wherein the first ultrasonic sensor measures a first distance (D1) from the first ultrasonic sensor to the ground surface, the center ultrasonic sensor measures a center distance (CD) from the center ultrasonic sensor to the ground surface; and the height of the ground (HG) is obtained by the following equation: HG=D1−CD+β.

13. A landing guidance method for an unmanned aerial vehicle (UAV) using ultrasonic waves, the landing guidance method comprising:

adjusting a gyro sensor located in a main body to maintain the UAV in a horizontal state;

measuring distances from the ground surface for landing by transmitting and receiving, by a plurality of ultrasonic sensors located in the UAV, ultrasonic waves to and from the ground surface;

detecting an unevenness of the ground surface based on the distances from the plurality of ultrasonic sensors to the ground surface;

generating a control signal whether to land on the ground surface or not in response to the detection of the unevenness; and transmitting the control signal to a plurality of motors.

14. The landing guidance method of claim 13, wherein the plurality of ultrasonic sensors includes a first ultrasonic sensor and a second ultrasonic sensor, the first ultrasonic sensor and the second ultrasonic sensor are spaced apart on the UAV by a sensor distance (DS), wherein the step of detecting the unevenness of the ground surface comprises:

measuring, by the first ultrasonic sensor, a first distance (D1) from the first ultrasonic sensor to the ground surface;

measuring, by the second ultrasonic sensor, a second distance (D2) from the second ultrasonic sensor to the ground surface;

receiving, by the controller, distance information including the sensor distance (DS), the first distance (D1), and the second distance (D2), calculating the unevenness of the ground surface;

determining a landing if the slope of the ground surface is within a predetermined range; and generating and transmitting a control signal to the plurality of motors.

15. The landing guidance method of claim 14, wherein the unevenness of the ground surface is a slope of the ground surface.

16. The landing guidance method of claim 13, wherein the step of detecting an unevenness of the ground surface comprises:

comparing gradients of points of the ground surface around a reference point with a predetermined convexity threshold when it is determined that the ground surface is convex according to the gradients of the points around the reference point, and determining whether the ground surface is suitable for landing and controlling the control signal corresponding to a determination whether the gradients of points are smaller than the predetermined convexity threshold; or comparing the gradients of the points of the ground surface around the reference point with a predetermined concavity threshold when it is determined that the ground surface is concave according to the gradients of the points around the reference point, and determining whether the ground surface is suitable for landing and controlling the control signal corresponding to the determination whether the gradients are smaller than the predetermined concavity threshold.

17. The landing guidance method of claim 13, further comprising:

transmitting and receiving, by the ultrasonic sensors, ultrasonic waves to and from the ground surface while the UAV is descending toward the ground surface;

analyzing the ultrasonic waves received by the ultrasonic sensors and determining, by the controller, whether there is an obstacle on the ground surface toward which the UAV is descending;

adjusting, by the gyro sensor, the UAV in the horizontal state when it is determined that there is an obstacle on the ground surface;

generating, by the controller, a signal to the UAV to rotate a circle for a predetermined number about an axis perpendicular from the main body to the ground surface;

transmitting and receiving, by the controller, ultrasonic waves to and from the ground surface for descending when the UAV rotates multiple times;

analyzing, by the controller, the ultrasonic waves and re-determining whether there is an obstacle on the ground surface; and re-determining, by the controller, whether the ground surface is suitable for the UAV to land on in reply to a determination whether there is an obstacle on the ground surface.

18. The landing guidance method of claim 13, further comprising analyzing, by the controller, the ultrasonic waves received from the ground surface and determining a physical property of the ground surface.

19. The landing guidance method of claim 13, wherein the plurality of ultrasonic sensors includes a first ultrasonic sensor and a center ultrasonic sensor, the plurality of motors include a first motor, the first ultrasonic sensor is located underneath the first motor and surrounded by a first sensor protection case, and the center ultrasonic sensor is located underneath the main body, wherein $\alpha$ refers to a distance from one end of the first sensor protection case to the first ultrasonic sensor, $\beta$ refers to a distance from one end of the first ultrasonic to the center ultrasonic sensor in a vertical direction, a threshold reference height (TRH) is obtained by the following equation: $TRH=\alpha+\beta$, and wherein if the threshold reference height (TRH) is greater than a height of the ground (HG), the step of the generating the control signal generates the control signal to land on the ground surface.

20. The landing guidance method of claim 19, wherein the first ultrasonic sensor measures a first distance (D1) from the first ultrasonic sensor to the ground surface, the center ultrasonic sensor measures a center distance (CD) from the center ultrasonic sensor to the ground surface; and the height of the ground (HG) is obtained by the following equation: $HG=D1-CD+\beta$.

* * * * *